UNITED STATES PATENT OFFICE.

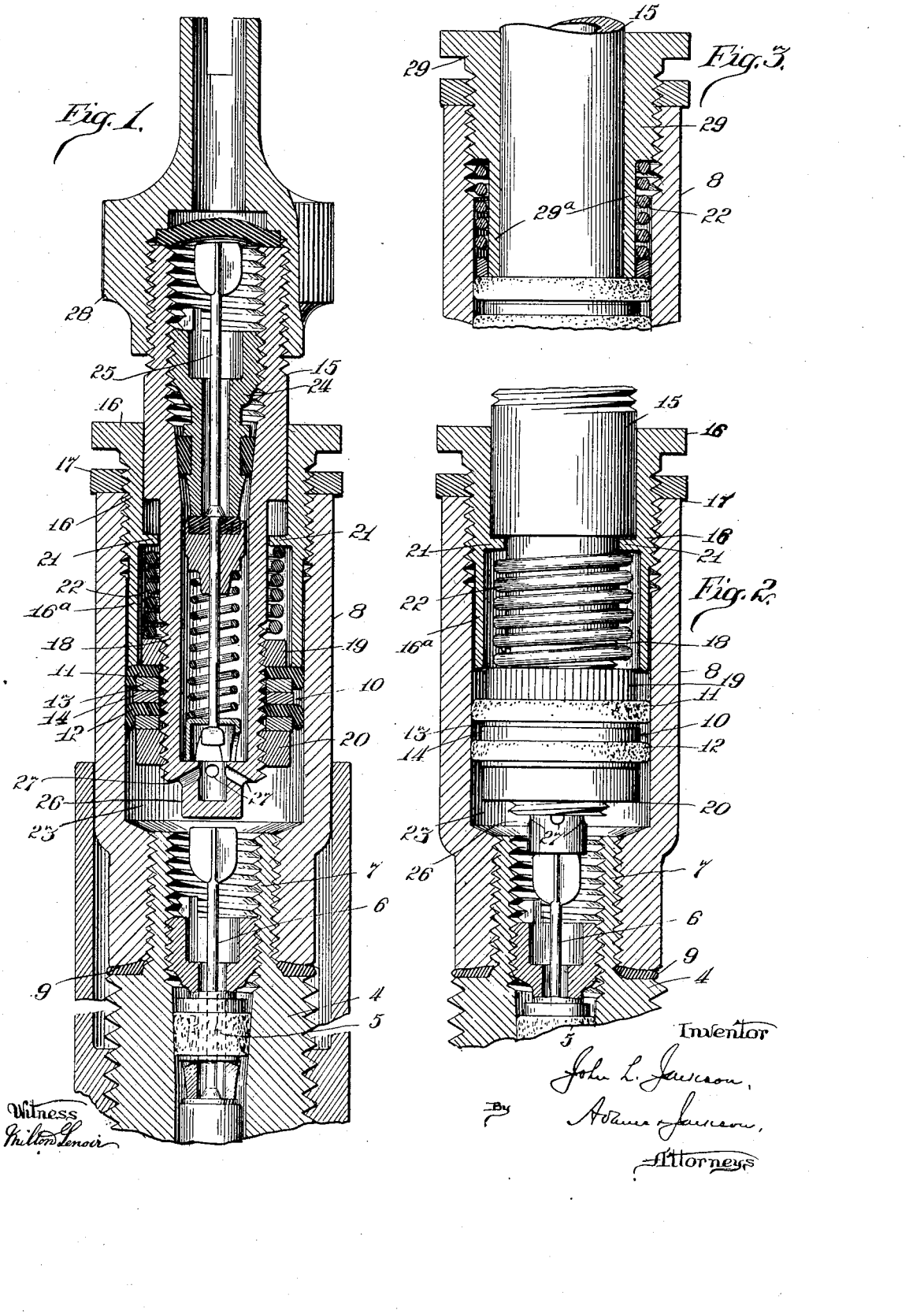

JOHN L. JACKSON, OF RIVER FOREST, ILLINOIS.

INDICATOR FOR PNEUMATIC TIRES.

1,346,961. Specification of Letters Patent. Patented July 20, 1920.

Application filed February 13, 1920. Serial No. 358,519.

*To all whom it may concern:*

Be it known that I, JOHN L. JACKSON, a citizen of the United States, and a resident of River Forest, in the county of Cook and State of Illinois, have invented certain new and useful Improvements in Indicators for Pneumatic Tires, of which the following is a specification, reference being had to the accompanying drawing.

My invention relates to devices used to indicate the pressure in a pneumatic tire for automobiles or other vehicles so that one can tell by inspecting the indicator whether or not the tire is properly inflated. It has for its object to provide an improved indicator which may be applied to the valve stem of an ordinary pneumatic tube and left there while the tire is in use, or may be incorporated as a part of the valve stem of the tire, and which will be capable of sustaining and indicating the tire pressure without appreciable leakage. Also to incorporate such improvements in an indicator constructed so that the tire can be inflated without its removal. I accomplish this object as illustrated in the drawings and as hereinafter described. What I regard as new is set forth in the claims.

In the accompanying drawings in which I have illustrated my invention as applied to an indicator of the general type shown and described in Letters Patent No. 1,311,898, granted to me August 5, 1919,—

Figure 1 is an enlarged central longitudinal section of my improved indicator applied to the usual valve stem of a pneumatic tire, showing the condition of the indicator when the tire is fully inflated.

Fig. 2 is a similar view, partly in elevation, showing the parts in the position they occupy when the tire is partly deflated; and Fig. 3 is a sectional view showing a modification.

Referring to the drawings,—4 indicates the valve stem of a pneumatic tire having the usual inside valve 5, which, as is well understood, comprises a plunger stem 6 by depression of which the inside valve 5 is opened. 7 indicates the usual screw-threaded nipple at the upper end of the valve stem 4. The indicator comprises a cylinder 8 which, in the construction illustrated, is arranged to be applied to the nipple 7, for which purpose it is provided at its lower end with internal screw-threads adapted to screw upon said nipple, the lower end of said cylinder being adapted to abut against the shoulder at the base of said nipple, as shown in Fig. 1. Preferably a gasket 9 is introduced between the abutting parts to make an air tight joint. 10 indicates a piston fitted in the cylinder 8 and adapted to reciprocate therein. Said piston may be of any construction suitable to prevent leakage of air around the piston. In the drawings I have shown it as comprising cup washers 11, 12 of leather or other suitable material spaced apart by metal disks 13, 14, but any other suitable construction may be employed. 15 indicates a tubular plunger which is fitted in the cylinder 8 to reciprocate therein. As illustrated, said plunger is fitted to slide in a bushing 16 screwed into the upper end of the cylinder 8 around the upper portion of the plunger and secured by a locking collar or nut 17 adapted to engage the upper end of the cylinder 8. The lower portion of the plunger 15 is reduced in diameter to form a stem 18 upon which the piston 10 is mounted, the piston being held tightly in position upon said stem by collars 19, 20 secured upon the stem 18 above and below the piston. Thus the piston is tightly clamped between said collars and may be adjusted longitudinally of the stem 18. As shown in Fig. 1, the bushing 16 is provided with a cylindrical extension 16ᵃ which extends into the cylinder 8 into position to intercept the piston 10 when said piston is in its outermost position, thereby forming an annular seat which is engaged by said piston and forms therewith an airtight closure. In the construction shown in Figs. 1 and 2, the bushing 16 is also provided with an intermediately disposed inwardly projecting flange or abutment 21 which serves as a stop for the upper end of a spring 22 fitted between said flange and the collar 19. Said spring, therefore, tends to move the piston 10 and plunger 15 downward against air pressure applied below the piston. 23 indicates the chamber in the cylinder 8 in which the piston 10 operates. As shown in Fig. 1, the plunger 15 is tubular and is provided with an inside valve 24 similar to the inside valve 5 so that the escape of air outwardly through said plunger is prevented when the parts of said inside valve are in normal position. By depressing the plunger stem 25 of the inside valve 24, however, air may be permitted to escape from the chamber 23 through said plunger. At its lower end the plunger 15 is provided with a boss or projection 26 which overlies the plunger stem 6 of inside valve 5 so that when the piston 10 is moved downwardly from the position shown in Fig. 1 the boss 26 will engage the stem 6 and move it inwardly, thereby opening the inside valve 5. When, however, the piston 10 is in the position shown in Fig. 1 the inside valve 5 is permitted to close normally. The boss 26 is provided with one or more perforations or passages 27 which afford communication between the chamber 23 and the bore of the plunger 15 below the inside valve 24. 28 indicates the usual valve stem cap.

The spring 22 is designed to exert a predetermined pressure inwardly on the piston 10, for example seventy pounds to the square inch, so that if the pressure in the chamber 23 below said piston falls below that point the piston 10 will be moved downward by the spring and will open the inside valve 5 by depressing its plunger stem 6. If the pressure in the air tube of the tire is below the predetermined pressure the inside valve 5 will therefore remain open until the tire is pumped up. This may be accomplished by applying a pump to the upper end of the plunger 15 in the usual way. The air supplied passes inwardly through the plunger 15 into the chamber 23 and then through the valve stem 4 into the tire, and as soon as the pressure in the tire and in the chamber 23 reaches the predetermined or critical point the air pressure below the piston will force it up into engagement with its seat at the lower end of the cylindrical extension 16ª. This upward or outward movement of the piston, of course, moves the plunger 15 outwardly, thereby indicating that the tire is inflated to or above the critical point. If desired, the exposed outer end portion of the plunger 15 may be provided with a scale to indicate the pressure in the chamber 23. By thus employing the pressure in the chamber 23 to hold the piston 10 tightly against its seat the escape of air from the chamber 23 is prevented so that the plunger 15 will remain projected for an indefinite length of time. If, however, for any reason the pressure in chamber 23 should fall below the critical point the spring 22 will force the piston 10 and plunger 15 inwardly, thereby opening inside valve 5 and equalizing the pressure in said chamber with that in the tire tube. If the pressure in the tire should fall below the critical point, because of a puncture or slow leak, the pressure in chamber 23 would also fall because air can pass from chamber 23 into the tire tube. This, therefore, would permit the spring 22 to move the piston 10 and plunger 15 inwardly and would indicate the fact that the tire pressure had fallen below the critical point.

It will be understood that a suitable spring 22 would be used, depending upon the critical pressure desired to be maintained, although adjustment within reasonable limits can be made by adjusting the position of the piston 10 upon the stem 18 by means of the collars 19, 20 and by inserting spacing washers of different thicknesses at one end or the other of the spring 22.

In Fig. 3 I have shown a modification in which instead of using the bushing 16 having the extension 16ª adjacent to the inner wall of the cylinder 8 a bushing 29 is used having an extension 29ª which is flush with the inner face of said bushing and is set a short distance from the inner wall of the cylinder 8 so that the spring 22 may be placed between the extension 29ª and the inner wall of the cylinder 8. By this construction the use of the inwardly projecting flange 21 on the bushing is avoided and a longer bearing for the plunger 15 is obtained. If desired, a sleeve 30 may be provided to inclose the valve stem 4 and the lower portion of the indicator, as shown in Fig. 1.

While I have shown my improved indicator as applied to the valve stem of a pneumatic tire equipped with an inside valve, and it is ordinarily desirable to employ that arrangement, my improved construction may be embodied in an indicator applied to the valve stem of a pneumatic tire not provided with such an inside valve, or the indicator itself may be made a part of or take the place of the usual valve stem. The generic claims hereinafter made are, therefore, to be construed accordingly.

What I claim as my invention and desire to secure by Letters Patent, is—

1. An indicator for pneumatic tires comprising a cylinder adapted to be connected with the air tube of the tire, a piston in said cylinder normally retracted and adapted to be projected by tire pressure, and an annular seat in said cylinder adapted to coöperate with said piston when the same is projected, to prevent the escape of air.

2. The combination with a cylinder adapted to be connected with the air tube of a pneumatic tire, and an annular seat in said cylinder, of a piston movable in said cylinder into and out of engagement with said seat, said piston being normally out of engagement with said seat and being movable into engagement therewith by air pressure to prevent the escape of air around said piston.

3. The combination with a cylinder adapted to be connected with the air tube of a pneumatic tire, and an annular seat in said cylinder, of a piston movable outwardly in said cylinder by air pressure into engagement with said seat, and means operating to move said piston inwardly when the air pressure is below a critical point.

4. An indicator for pneumatic tires comprising a cylinder adapted to be connected with the air tube of a tire, a piston in said cylinder normally retracted and adapted to be projected by tire pressure, a sleeve in said cylinder forming a seat adapted to coöperate with said piston when the same is projected to prevent the escape of air and a stem connected with said piston and projecting through said sleeve.

5. An indicator for pneumatic tires comprising a cylinder adapted to be connected with the air tube of a tire, a piston in said cylinder normally retracted and adapted to be projected by tire pressure, a seat in said cylinder adapted to coöperate with said piston when the same is projected, to prevent the escape of air, and means whereby the tire may be inflated through said cylinder.

6. An indicator for pneumatic tires comprising a cylinder adapted to be connected with the air tube of a tire, a plunger operating in said cylinder and projecting beyond the outer end thereof, said plunger being normally retracted and being adapted to be projected by air pressure, and a seat in said cylinder around and coöperating with said plunger when the latter is projected to form an air tight closure.

7. An indicator for pneumatic tires comprising a cylinder adapted to be connected with the air tube of a tire, a tubular plunger operating in said cylinder and projecting beyond the outer end thereof, said plunger being normally retracted and being adapted to be projected by air pressure, an air valve in said plunger, and a seat in said cylinder around and coöperating with said plunger when the latter is projected to form an air tight closure.

8. An indicator for pneumatic tires comprising a member adapted to be connected to the air tube of a tire, a piston in said member, a tire valve between said piston and the air tube of the tire, said piston normally operating to open said tire valve and being actuated by tire pressure above a critical point to close the tire valve, and means coöperating with said piston when the tire pressure is above the critical point to form an air tight closure.

9. An indicator for pneumatic tires comprising a member adapted to be connected with the air tube of a tire, a piston in said member, a tire valve between said piston and the air tube of the tire, said piston operating normally to open said tire valve, and being actuated by tire pressure above a critical point to close the tire valve, and a seat coöperating with said piston when the tire pressure is above the critical point to form an air tight closure.

10. An indicator for pneumatic tires comprising a member adapted to be connected with the air tube of a tire, an externally projecting tubular plunger in said member, a tire valve between said plunger and the air tube of the tire, said plunger operating normally to open said tire valve and being actuated by tire pressure above a critical point to close the tire valve, an inflation valve in said plunger, and a seat coöperating with said plunger when the tire pressure is above the critical point to form an air tight closure.

JOHN L. JACKSON.